July 19, 1966 D. W. BLEM ETAL 3,261,030
PORTABLE SEAT
Filed June 18, 1963
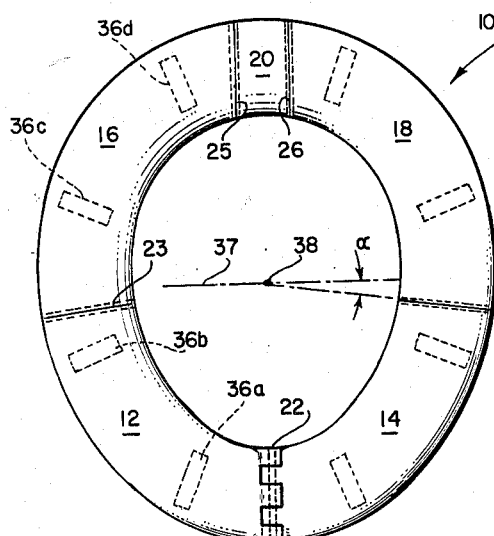
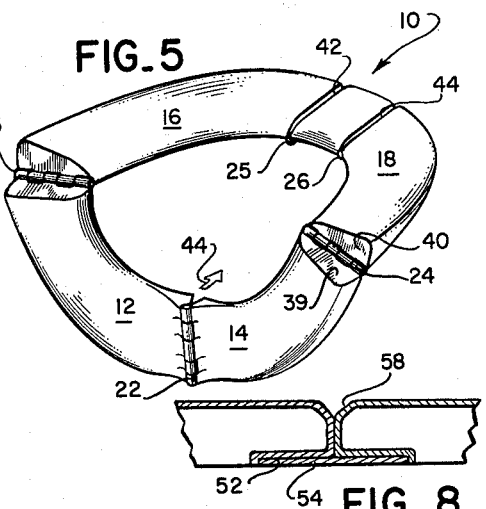
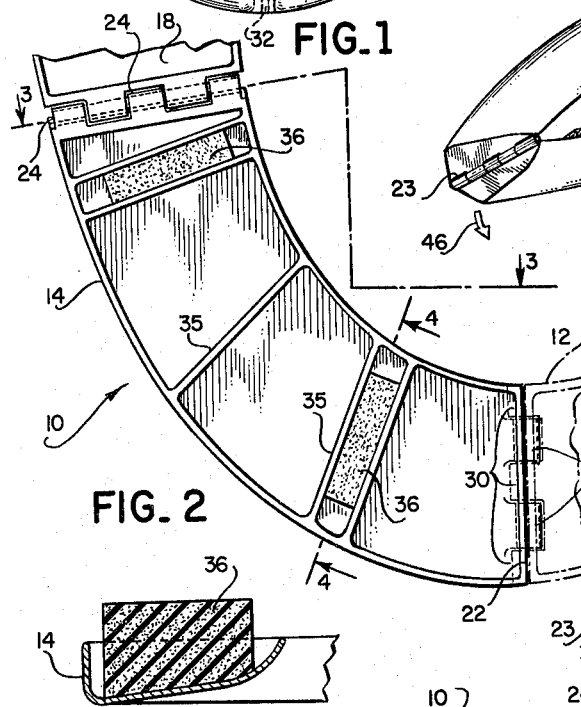
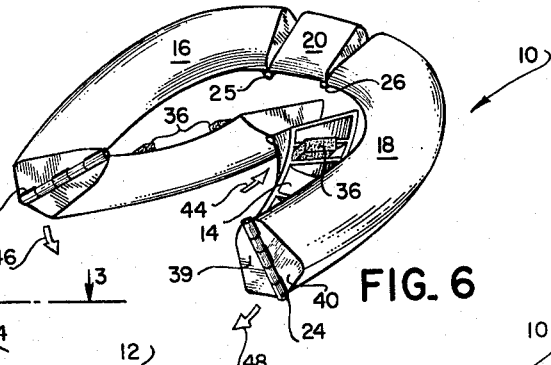
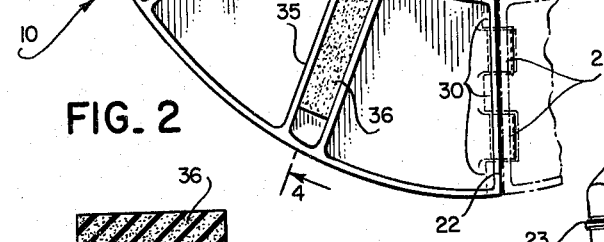
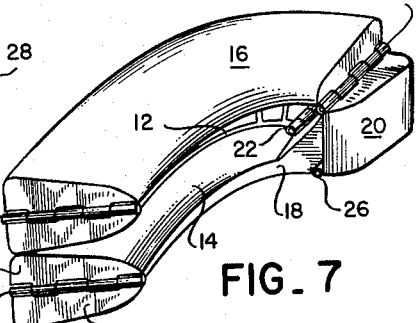
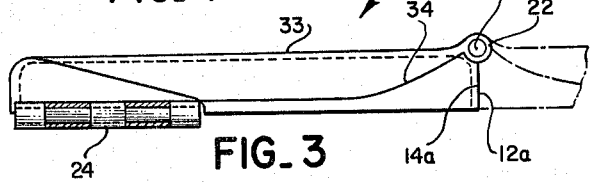
*INVENTORS*
DONALD W. BLEM
JOHN I. SYLER
By *Lowell S. Turner*
Agent

United States Patent Office 3,261,030
Patented July 19, 1966

3,261,030
PORTABLE SEAT
Donald W. Blem, Burbank, Calif. (10516 Edison Way, North Hollywood, Calif.), and John I. Syler, 407 North Ave. 52, Los Angeles, Calif.
Filed June 18, 1963, Ser. No. 288,782
6 Claims. (Cl. 4—239)

This invention relates to improvement in collapsible and portable seats of a type which may be readily folded and unfolded for easy storage and carrying, but which provide a hygenic and comfortable seat.

The seat of this invention is more particularly adapted for carrying by travelers in a compactly folded condition. When unfolded into its flat condition it may be utilized to cover toilet seats in public rest rooms for reasons of sanitation and personal comfort.

While seats of the class presently described and claimed have been heretofore utilized, each has characteristically included detrimental and undesirable features. It is the usual practice to provide seats which are either not foldable or to provide foldable seat segments which are separable from one another for transport and storage purposes. Other seats, although being foldable, are heavy, bulky and cumbersome in concept and construction.

A primary object of this invention is to overcome the detrimental aspects of the prior art by providing an improved sanitary seat which is compact, light weight and convenient to utilize and transport.

Another object is to provide a foldable seat, the segments of which remain integral at all times.

A further object is to provide a seat which is comfortable and sanitary while retaining its structural integrity and its convenience of utilization and storability.

These and other objects of invention will become apparent from the specification and the accompanying drawings, in which:

FIGURE 1 is a plan view of a typical seat of the persent invention;

FIGURE 2 is a fragmentary view of a portion of the seat as viewed from its underneath side;

FIGURE 3 is a sectional view as taken along lines 3—3 of FIGURE 2 to illustate the hinge configuration;

FIGURE 4 is a sectional view through a cushion member, as taken along line 4—4 of FIGURE 2;

FIGURES 5 through 7 are perspective views illustrating the seat in various stages of folding, FIGURE 7 being the fully folded position; and FIGURE 8 is a fragmentary view illustrating an alternative hinge embodiment.

The invention which is specifically set forth herein is a seat adapted for covering permanent toilet seats as an auxiliary and sanitary cover, but which is further adapted to be folded into a compact unit for ease of storing and carrying, is generally comprised of a plurality of hingedly connected sections or segments, the hinges being so located that the segments may be collapsed and folded against one another without the necessary of structural separation of any portion thereof.

Referring more particularly to the drawings, FIGURES 1 through 4 show the general and preferred structural characteristics of the seat of the present invention. It will be understood that the seat is sometimes referred to as a seat cover since this is one of its primary functions. The seat which is generally identified by the numeral 10, includes a pair of frontal segments 12 and 14, which may be mirror images of one another, a pair of rearward segments 16 and 18, which may also be mirror images, and an after segment 20. Each segment has a smooth upper surface, a substantially hollow under side and is connected to its adjacent segment by one of a plurality of hinges 22 through 26.

Although two specific hinge embodiments are illustrated and described herein, it is to be understood that any one of a large number of conventional hinge types may be utilized without departing from the concept of the invention. The hinges illustrated in FIGURES 1–4 are of the character wherein each segment is provided with at least one and preferably a plurality of hinge elements adapted to mesh with like elements upon adjacent seat segments. In particular, hinge 22 comprises a pair of pin-receiving portions 28 connected to seat segments 14 and three pin-receiving portions 30 connected to the seat segment 12. It is preferable, although not mandatory, that these hinge portions are fabricated integrally with the seat segments for simplicity and integrity of construction and for economy of production. These portions, when meshed in the manner illustrated, are conventionally interconnected by means of a pin 32.

Of significance is the fact that the ends of the seat segments are symmetrical about the center line of the hinges. For example, the segment ends 12a and 14a are abutted upon the vertical center line of the hinge 22 when the seat is horizontally disposed in its extended position. Additionally, when the seat is so positioned, the horizontal center line of the hinge lies in the plane of the uppermost surface of the seat. The numeral 33 indicates this surface plane. This hinge location is one of the features lending to the seat the capability of having its segments folded flat against one another.

The upper surfaces of the segments 12 and 14 adjacent to hinge 22 are usually faired smoothly into the hinge 22 to provide optimum structural support for the hinge, a pleasing aesthetic appearance and utilitarian comfort. The numeral 34 indicates a typically faired surface.

In their preferred embodiment, the segments 12–18 are generally arcuate in shape and are constructed from durable plastic or a similar light weight material. Each segment, with the possible exception of segment 20, is provided with a plurality of ribs, typically indicated by the numeral 35 in FIGURE 2. A pair of ribs 35 are oriented adjacently parallel to one another in each of the major segments 12–18. As best illustrated in FIGURE 4, a cushion member 36 is positioned between such parallel ribs, the cushions being of heights sufficient to protrude from between the ribs 35. The cushions are also of a sufficiently rigid consistency and extend beyond the ribs 35 a distance sufficient to prevent undue structural contact between the ribs 35 and the surface against which the seat is placed during its utilization. The cushions also serve the function of friction members to prevent seat slippage.

In order that the seat can fold compactly without structural interference between the cushion members 36 and other structural portions of the seat, the parallel ribs 35 between which the cushions are retained are positioned in staggered relationship in adjacent segments. By way of illustration, FIGURE 1 shows cushions 36a and 36b in the segment 12 and cushions 36c and 36d in the segment 16. The cushion 36a is closer to hinge 23 than is the cushion 36d. Similarly, the cushion 36b is closer to the hinge 23 than is the cushion 36d. Hence, when the seat is folded such that the undersides of the segments abut one another, as hereinafter described, the various cushions extend into the hollow interior of the abutted segment, thereby eliminating the possibility of their interfering with other structure. The cushion lengths and their radial orientations with respect to the segment structure must also be controlled such that there will be no interference between the cushions and the edges of the lower sides of the segments.

Except for their hinge components the segments 12 and 14 are preferably mirror images of one another, as are also segments 16 and 18. It is also preferable that the hinges 23 and 24 be located and that the internal arcuate edges of the segments be designed such that the contours of segments 12 and 14 substantially match those of the segments 16 and 18, respectively, when the segments are folded. In accomplishing this, the hinges 23 and 24 are oriented an angle α with respect to and forward of the transverse center line 37 of the seat, a radial extension of the hinge lines passing substantially through the geometric center 38 of the seat. Although the angle α can be any convenient angle to facilitate the objects of the invention, it is usually within 6° to 10° forward of the transverse center line and preferably about 8°. It has been found that the latter angle results in a highly acceptable folding capability.

The after segment 20 is shorter in length than are the other segments, its function being to provide an interconnecting link between the rearward segments 16 and 18, and to thereby alleviate the necessity for separation of the seat segments in accomplishing a complete and compact folding of the seat. The frontal segments 12 and 14 are also shorter in length than are the rearward segments 16 and 18 in order that the frontal segments may fold within the length of the rearward segments.

Hinge 22 is the only hinge member which is located upon the upper surface of the seat when the seat is unfolded, the rest of the hinges being located upon the under side of the seat. This feature further contributes to complete foldability of the seat whereby the ultimate in compactness is achieved.

A complete folding procedure of the seat is illustrated in FIGURES 5–7. In FIGURE 5 the segments 12 and 14 have been folded downward about hinges 23 and 24 from the fully extended position of FIGURE 1. In this partially folded condition the flat ends 39 and 40, as typical examples, are exposed. These ends upon each of the seat segments are firmly abutted against one another when the seat is fully extended, thereby providing structural support for the adjacently located seat segments.

It will also be noted relative to FIGURE 5 that the hinge 22 has begun to break and that it and its immediately connected structure have started to move rearward in the direction of the arrow 44. The segment joints at hinges 25 and 26 have also perceptibly started to fold.

As the folding rearward of the segments 12 and 14 progresses and as the hinge 22 is further actuated (FIGURE 6), the segments 16 and 18 move down and inward in the directions of the arrows 46 and 48, also causing the hinges 25 and 26 to be further actuated. As seen in FIGURE 7, the folding is completed when the smooth upper sides of the segments 12 and 14 are moved into abutment with one another, thereby pulling the flat under sides of the segments 16 and 18 into abutting relation with the flat under sides of the segments 12 and 14. When these seat segments are so folded the segment or link member 20 will be seen to be of the proper width to just span the folded thickness of the segments 12 and 14 and to interconnect the segments 16 and 17. This is one of the prime features of the invention which give to the seat its capability of folding into a tight and compact package for ease in portability.

The seat is extended by simply reversing the described procedure.

The seat, when so constructed, is extremely simple to fold and unfold. The procedure is easily capable of operation by a small child.

As illustrated in FIGURE 8, an alternate hinge arrangement is sometimes provided in place of that hinge described above. This hinge is the ultimate in simplicity and of the lightest weight possible. The surface structure of the seat segment is usually recessed, as at numeral 52, and a strip of flexible material 54 is secured therein to provide the required hinge action. The material of the hinge, which may, for example, be heavy canvas, is secured to the seat by bonding or the like.

It is also sometimes desirable, in order to prevent the occupant of the seat from being pinched by the upper joints of the seat, to provide a slight V-cut or bevel 58 at the segment ends adjacent the upper surfaces. Such a structure is illustrated in FIGURE 8. This bevel need only extend into the seat surface a depth sufficient to prevent the skin of the seat occupant from becoming wedged between the segment ends.

Although the preferred embodiment of the invention has been illustrated and described in detail, it will be understood that the same is by way of illustration and example only and modification thereto may be made without departing from the spirit and scope of the invention, the scope of the invention being limited only by the appended claims.

We claim:
1. A portable seat comprising a plurality of arcuate segments interconnected by hinge means to form a continuous ring, a first pair of said segments being hingedly connected, a second pair of said segments respectively hingedly connected to said first pair of segments, and a linking segment hingedly connected to the respective ones of said second pair of said segments, said segments being foldable against one another into a compact, integrated package.

2. A portable seat comprising a pair of frontal segments hingedly connected to one another, a pair of rearward segments, said rearward segments respectively hingedly connected to opposite ones of said frontal segments, an after segment hingedly connected to said rearward segments, the total of said connected segments defining a continuous collapsible ring adapted to be folded without disconnection of said segments into a compact package.

3. The portable seat of claim 2 wherein hinge means connects said frontal segments and is located at upper surfaces thereof, hinge means connect said rearward segments to said frontal segments and are located at bottom surfaces thereof, and hinge means connect said after segment to said rearward segments and are located at bottom surfaces thereof.

4. The portable seat of claim 3 wherein each said hinge means connecting one of said rearward segments to one of said frontal segments is oriented at an acute angle forward of a transverse center line of said seat, a radial extension of the axis of said hinge passing substantially through the geometric center of said seat.

5. The portable seat of claim 2 wherein hinge means are provided to connect said segments, said hinge means being flexible material affixed to adjacent segments.

6. The portable seat of claim 2 wherein said after segment has a length approximating the combined thickness of said forward segments.

References Cited by the Examiner
UNITED STATES PATENTS

| | | | |
|---|---|---|---|
| 1,015,741 | 1/1912 | Parker | 4—_ |
| 2,457,726 | 12/1948 | Richards | 4—239 |
| 2,545,598 | 3/1951 | Barnes | 4—239 |

LAVERNE D. GEIGER, *Primary Examiner.*

H. GROSS, *Assistant Examiner.*